United States Patent
Naffziger et al.

(10) Patent No.: US 7,844,838 B2
(45) Date of Patent: Nov. 30, 2010

(54) INTER-DIE POWER MANAGER AND POWER MANAGEMENT METHOD

(75) Inventors: Samuel D. Naffziger, Fort Collins, CO (US); Christopher A. Poirier, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 643 days.

(21) Appl. No.: 11/589,573

(22) Filed: Oct. 30, 2006

(65) Prior Publication Data

US 2008/0104428 A1    May 1, 2008

(51) Int. Cl.
    *G06F 1/00* (2006.01)
(52) U.S. Cl. .................................. 713/300; 713/320
(58) Field of Classification Search .............. 713/300, 713/320
    See application file for complete search history.

(56) References Cited

U.S. PATENT DOCUMENTS

| | | | |
|---|---|---|---|
| 5,142,684 A * | 8/1992 | Perry et al. ............... | 713/320 |
| 6,711,691 B1 * | 3/2004 | Howard et al. ............ | 713/300 |
| 6,922,783 B2 * | 7/2005 | Knee et al. ............... | 713/320 |
| 6,990,598 B2 * | 1/2006 | Sherburne, Jr. ............ | 713/600 |
| 7,162,279 B2 * | 1/2007 | Gupta ....................... | 455/574 |
| 7,398,414 B2 * | 7/2008 | Sherburne, Jr. ............ | 713/600 |
| 2004/0098650 A1 * | 5/2004 | Rajsuman ................... | 714/742 |
| 2004/0121797 A1 * | 6/2004 | Gupta ....................... | 455/550.1 |
| 2005/0289365 A1 * | 12/2005 | Bhandarkar ................. | 713/300 |
| 2006/0069936 A1 * | 3/2006 | Lint et al. .................. | 713/320 |
| 2007/0074011 A1 * | 3/2007 | Borkar et al. .............. | 712/227 |
| 2007/0088966 A1 * | 4/2007 | Price et al. ................ | 713/324 |
| 2007/0124608 A1 * | 5/2007 | Knowlson et al. .......... | 713/300 |
| 2007/0226482 A1 * | 9/2007 | Borkar et al. .............. | 713/100 |

* cited by examiner

*Primary Examiner*—Chun Cao

(57) ABSTRACT

Devices and methods for managing power on a module are disclosed herein. In one embodiment, a module comprises a first die; a second die; and a power manager. The power manager monitors the power requirements of the first die and the second die and allocates power to the first die and the second die based on the power requirements.

13 Claims, 2 Drawing Sheets

INTER-DIE POWER MANAGER AND POWER MANAGEMENT METHOD

BACKGROUND

Conventional integrated circuits or modules may have multiple processors or die mounted to a single module. The module is connected to a power source and, therefore, has a limited amount of power that may be drawn from the power supply. The power drawn from the power supply is divided between the die. For example, if the module has two die and 100 watts is available to the module, each die may be limited to using 50 watts.

Situations arise wherein one of the die may be relatively idle and another die may be required to perform extensive processing, which requires an increase in the operating frequency of the die. The increased operating frequency, in turn, requires that the die draw more power. In the example described above, the active die will be limited to 50 watts, which limits the operating frequency of the die. Although the total power consumed by the second die may be less than 50 watts and the power consumed by the module may be less than the 100 watts available from the power supply. Thus, potential performance from the available, but unused, power may go unexploited with a simple, fixed division of power as described above.

SUMMARY

Devices and methods for managing power on a module are disclosed herein. In one embodiment, a module comprises a first die; a second die; and a power manager. The power manager monitors the power requirements of the first die and the second die and allocates power to the first die and the second die based on the power requirements.

DETAILED DESCRIPTION

Figure 1:
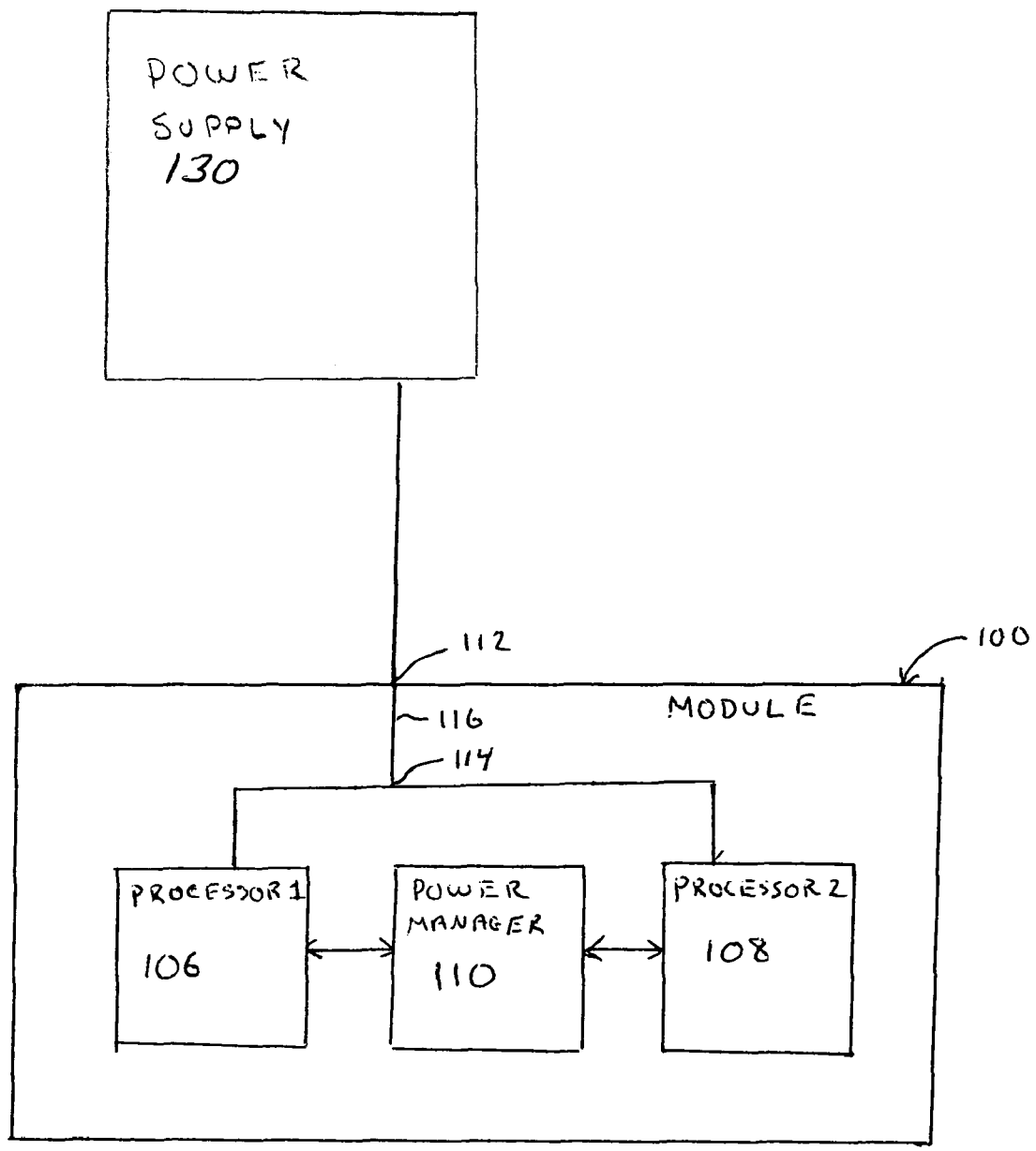
FIG. 1 is an embodiment of a module having two processors and a power manager.

Referring to FIG. 1, the devices and methods described herein serve to manage the power available to die located on a module 100. The die could be any devices or circuits. However, in the embodiments described herein, the die are processors. In the embodiment of FIG. 1, there are two processors that are referred to individually as the first processor 106 and the second processor 108. Included in the module 100 is a power manager 110. It is noted that the power manager 110 may be firmware, an embedded controller or the like that communicates with the processors 106, 108. In other embodiments, the power manager 110 may be software or code that is executed on one or both processors 106, 108. It is noted that other devices may be located on the module 100; however, in order to simplify the drawings, they have not been included.

The module 100 includes two nodes, a first node 112 and a second node 114, located on the ends of a segment 116 of the module 100. The segment 116 conducts power to the processors 106, 108. In some embodiments, the resistance of the segment 116 is known. Voltages are measured at the first node 112 and the second node 114. Therefore, the current drawn by the module 100 by way of the node 112 may be readily calculated.

A power supply 130 is connectable to the module 100 at the node 112. The amount of current being drawn from the power supply 130 may be measured by way of the difference in voltage at the nodes 112 and 114 divided by the resistance of the segment 116. The power supply 130 may be able to only supply a limited amount of power or current to the module 100. Thus, the available power needs to be allocated between the two processors 106, 108, which is described in detail below.

As described in greater detail below, the power consumption of a processor is proportional to the frequency at which the processor operates. Thus, a processor operating at a high frequency consumes more power than when it operates at a low frequency. The devices and methods described herein serve to optimize the performance of the processors 106, 108 by allocating power in such a way as to enable both processors 106, 108 to operate at the highest frequencies possible.

Conventional modules simply divide the power between the die or processors on a circuit. Other modules fix the power allocation between the die, which does not provide for changes in the power allocation. This allocation of power does not provide for one die or processor to draw more power when other die or processors are inactive and not drawing their power allocations. The devices and methods described herein overcome this problem by allocating power among die depending on the required current draw of the die.

The power manager 110 serves to allocate power between the processors 106, 108. The amount of power used by a processor is proportional to the frequency at which the processor operates. A processor operating at a high frequency draws more power than when it operates at a low frequency. High frequency operation is required in order for a processor to quickly execute instructions. Likewise, when the processor executes fewer instructions or is idle, its operating frequency is reduced.

In conventional modules, the power allocated to each die or processor is fixed. For example, each processor may be allocated fifty percent of the available power regardless of the frequency at which the processors are operating. This leads to situations wherein a first processor may be idle and not using all of its allocation of power. A second processor may be executing a plurality of instructions and may be able to increase the execution speed by increasing its operating frequency. Because of the fixed power allocation, the second processor is unable to increase its operating frequency beyond the frequency corresponding to the fixed power allocation.

The methods and devices described herein overcome the above-described problems associated with fixed power allocations. In summary, the processors 106, 108 indicate their processing requirements to the power manager 110, which monitors the power consumption of the entire module 100. The power manager 110 may then enable the processors 106, 108 to change their operating frequencies depending on the available power. As an example, the total power available to the module 100 may be one hundred watts. The power manager 110 may, by default, allocate fifty watts to each processor. At one point, the first processor 106 may be relatively idle and may only use thirty watts during this idle period. Accordingly, the first processor 106 is operating at its optimal performance using only thirty watts. The second processor 108 may be executing a lot of code and may be operating at the frequency limit for its fifty watt allocation. Accordingly, the second processor 108 is not operating optimally, but it could operate optimally if it could increase its operating frequency. In order to increase the operating frequency of the second processor 108, the power manager 110 may allocate power that would otherwise be used by the first processor 106 to the second processor 108. The second processor 108 may then increase its frequency to correspond to the increased available power.

The operating frequency of the first processor 106 is then limited because some of its power has been allocated to the second processor 108. Should the first processor 106 need to increase its operating frequency, it will have to do so by way of the power manager 110. For example, the first processor 106 may send a signal or the like to the power manager 110 indicating that it needs to increase its operating frequency and, thus, needs to use more power. The power manager 110 may then instruct the second processor 108 to reduce its power consumption or operating frequency so that power may be allocated to the first processor 106. The power allocation will shift between the processors 106, 108 until both processors are operating at the same fraction of optimal performance. This fraction of optimal performance is sometimes referred to as optimability. It is noted that optimal performance is achieved when a processor is able to operate with the need to increase its operating frequency.

With regard to the previous example, the first processor 106 may be operating at one hundred percent of optimal performance even when it only uses thirty watts of power consumption because there is no need to run faster. The second processor 108 will be operating at less than one hundred percent performance even when it consumes fifty watts because it has a very active application running. It becomes the job of the power manager to balance the performance of both processors 106, 108 by allocating power between the processors 106, 108 until their performances equal. This will result in active processors receiving more power and running at higher frequencies than inactive processors.

Performance optimality can be calculated in different ways. In one embodiment, performance optimality is calculated by dividing the desired operating frequency of a processor by the actual operating frequency of the processor. The desired frequency could be up to one hundred percent of the maximum frequency the processor can achieve. It is likely that the power consumed by a processor operating at maximum frequency would be considerably larger than one half of the power available to the module 100. Thus, if both processors 106, 108 want to achieve maximum frequency due to a high workload, they will both be limited to the same fraction of that maximum. Their performance optimality will be less than one hundred percent each, but the performance optimality may be the same for both processors 106, 108.

Similarly if the first processor 106 is idle and the second processor 108 wants to operate at its maximum frequency, the second processor 108 will receive power from the power manager 110 until that maximum frequency is achieved. In this situation, the performance optimality of both processors is equal to 1.0 or one hundred percent.

Figure 2:
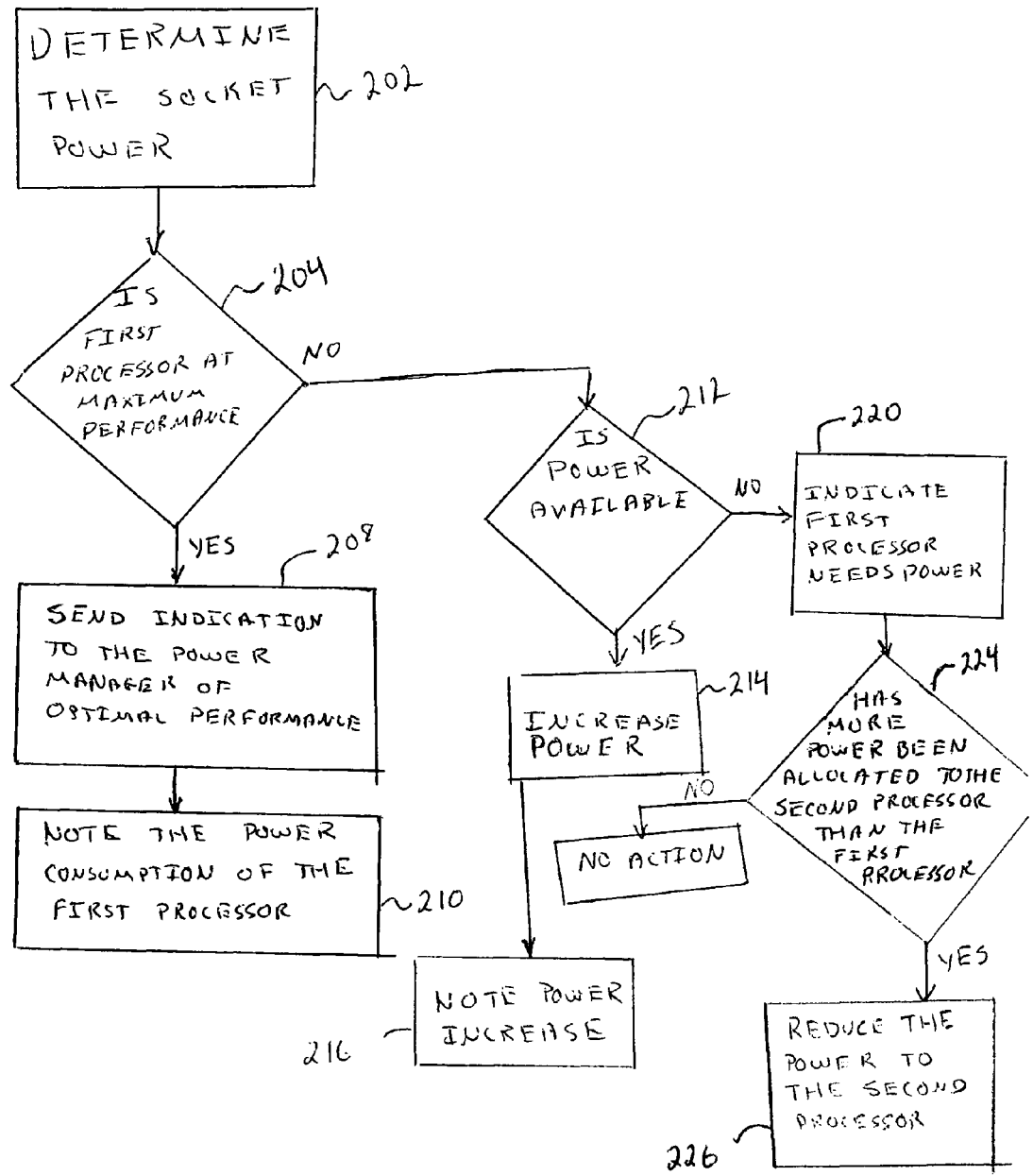
FIG. 2 is an embodiment of a method for allocating power between the two processors of FIG. 1.

It should be noted that other power allocation defaults may be assigned to the processors 106, 108. For example, if both processors 106, 108 are required to operate at high frequencies, the power manager 110 may allocate power on a fixed allocations, such as sixty percent to one processor and forty percent to the other processor depending on what is performance optimal. It should also be noted that his approach makes the power management independent of the exact power used by each processor. Sometimes manufacturing differences will result in the same processor design consuming significantly different power for the same workload and frequency. By only communicating performance optimality (not power) to the power manager, these manufacturing differences are normalized out A flow chart 200 illustrating an embodiment of a method of allocating power between the two processors 106, 108 is shown in FIG. 2. At block 202, the socket power is determined. This is the power that is available to the module 100 by way of the power supply 130. At decision block 204 a determination is made as to whether the first processor 106 is operating at its optimal frequency.

If the first processor 106 is operating at optimal performance, processing proceeds to block 208. Block 208 sends an indication to the power manager 110 that the first processor 106 is operating optimally. In other words, the first processor 106 does not need to increase its operating frequency and, thus, does not need to consume more power. Processing proceeds to block 210 where the power consumption of the first processor 106 is noted to the power manager 110. This enables to the power manager 110 to reallocate power if necessary.

Referring again to decision block 204, if the decision of decision block 204 is negative, processing proceeds to decision block 212. Decision block 212 determines if there is power available to be allocated to the second processor 208. If power is available, processing proceeds to block 214 where the power allocation to the first processor 106 is increased. This situation may occur when the second processor 108 is not operating at a high frequency and, thus, is not consuming a high amount of power. At block 216, the increased power allotment to the first processor 106 is noted, which serves to track the power allocation between the processors 106, 108.

If the outcome of decision block 212 is negative, meaning that no more power is available for the first processor 106, processing proceeds to block 220. The negative result of block 212 indicates that, according to the power manager 110, there is no available power from the power source 110 and the second processor 108 is using all of its allocated power.

Processing then proceeds to decision block 224 where a determination is made as to whether the second processor 108 has been allocated more power than the first processor 108. If both processors 106, 108 need to increase their performance, the power manager 110 may allocate equal power to both processors. If the decision of block 224 indicates that the second processor 108 has not been allocated more power than the first processor 106, no further action is taken.

If the decision of decision block 224 indicates that the second processor 108 has been allocated more power than the first processor 106, processing proceeds to block 226. Block 226 decreases the power allocated to the second processor 108 in order to transfer the power to the first processor 106. This reallocation of power may continue until both the first processor 106 and the second processor 108 have been allocated the same amount of power.

It is noted that if the processors 106, 108 have been allocated the same amount of power and the first processor 106 still needs power, the request for more power from the first processor 106 may stay in the power manager 110. The power manager 110 may continuously query the second processor 108 to determine if it may operate at a reduced frequency, which requires less power. If so, the power manager 110 may reduce the power allocation to the second processor 110 and allocate the power to the first processor 106.

As set forth above, the devices and methods described herein serve to efficiently allocate the available power between die on a module. The result increases the operating frequency of a die on the module without diminishing the performance of other die located on the module.

What is claimed is:

1. A module comprising:
  a power manager coupled to a first processor and a second processor, the power manager allocating power between the first processor and the second processor such that the first processor performs at a first fraction of a first optimal performance and the second processor performs at the first fraction of a second optimal performance.

2. The module of claim 1, wherein the first optimal performance is equal to a desired operating frequency of the first processor divided by an actual operating frequency of the first processor.

3. The module of claim 1, wherein the first optimal performance is not equal to the second optimal performance.

4. The module of claim 1, wherein the power manager determines whether the first processor may operate at a reduced frequency by repeatedly querying the first processor.

5. The module of claim 1, wherein the first fraction is 1/1.

6. A method, comprising:
allocating power to a first processor;
allocating power to a second processor coupled to the first processor;
determining a first optimal performance of said first processor;
determining a second optimal performance of said second processor; and
changing the power allocation to the processors such that the first processor performs at a first fraction of the first optimal performance and the second processor performs at the first fraction of the second optimal performance.

7. The method of claim 6, wherein the first optimal performance is equal to a desired operating frequency of the first processor divided by an actual operating frequency of the first processor.

8. The method of claim 6, wherein the first optimal performance is not equal to the second optimal performance.

9. A method, comprising:
allocating power to a plurality of coupled processors;
determining a plurality of optimal performances, one for each of said plurality of processors;
changing power allocation to said plurality of processors such that the plurality of processors perform at fractions of their respective optimal performance, each fraction being equal.

10. The method of claim 9, wherein optimal performance of each processor is equal to a desired operating frequency of the respective processor divided by an actual operating frequency of the respective processor.

11. The method of claim 6, further comprising determining whether the first processor may operate at a reduced frequency by repeatedly querying the first processor.

12. The method of claim 9, wherein each optimal performance is not the same.

13. The method of claim 9, further comprising determining whether each processor may operate at a reduced frequency by repeatedly querying each processor.

* * * * *